Sept. 8, 1931. J. HARTNESS 1,822,027
CAM CONTROLLED THREAD GAUGE
Filed March 2, 1929
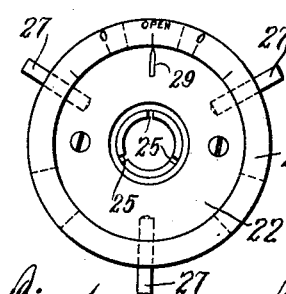
Fig. 1
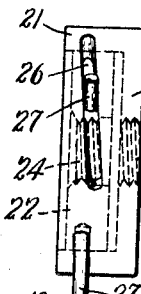
Fig. 2
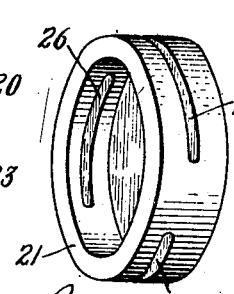
Fig. 3
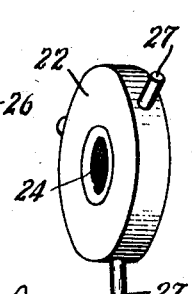
Fig. 4
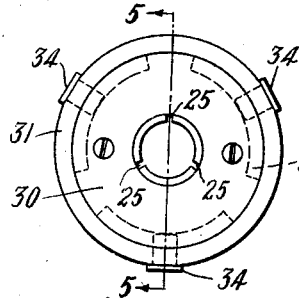
Fig. 7
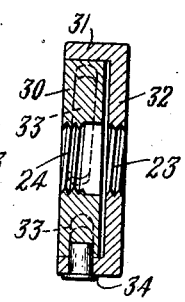
Fig. 8
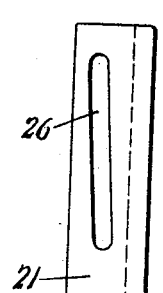
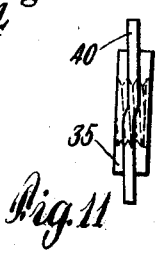
Fig. 11
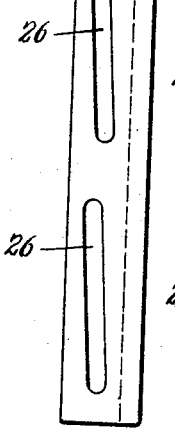
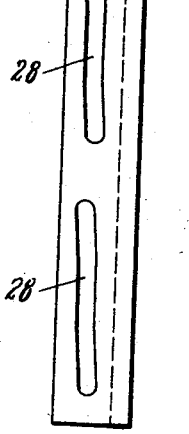
Fig. 5  Fig. 6  Fig. 12
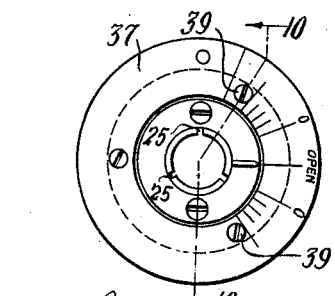
Fig. 9
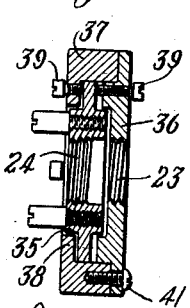
Fig. 10
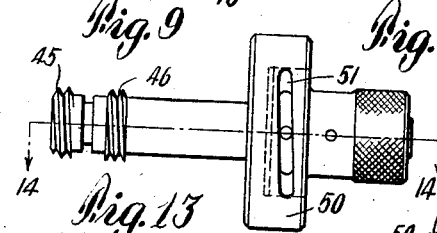
Fig. 13
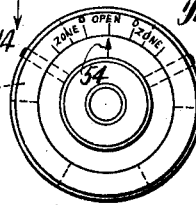
Fig. 15
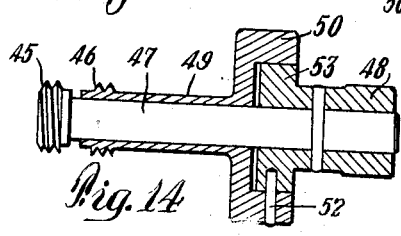
Fig. 14
Inventor:
James Hartness.
by Wright, Brown, Quinby & May
Attys.

Patented Sept. 8, 1931

1,822,027

UNITED STATES PATENT OFFICE

JAMES HARTNESS, OF SPRINGFIELD, VERMONT

CAM-CONTROLLED THREAD GAUGE

Application filed March 2, 1929. Serial No. 343,990.

This invention relates to a gauge for testing screw threads for error in pitch diameter and lead. A gauge embodying the present invention may comprise essentially two threaded members for engagement with a screw thread to be tested, the threaded gauge members being capable of relative rotational gaging motion, the angles of such rotation when the members are in engagement with a master thread being compared with the angles of rotation permissible when the members are in engagement with a screw to be tested. The embodiments of the present invention hereinafter described consist of a pair of ring-shaped members, each having an interior thread to receive an exteriorly threaded screw to be tested. If either of these gauge members be rotated while held against axial movement, the gaging thread will have an apparent axial movement, the direction depending on the direction of rotation and on whether it is a right hand or a left hand thread. This apparent axial progress of the thread due to rotation of a member may be modified by bodily axial movement of the member so as to increase, diminish or reverse the apparent motion of the thread. If two such gauge members are held against axial movement and are rotated relatively to each other, their respective threads will have an apparent travel axially in opposite directions. This relative apparent travel of the threads of the gaging members may be modified by controlled relative axial movement of the members as they rotate. When the gaging members are in engagement with a screw and their bodily movment is controlled, the mutual approaching and separating motions of the gaging threads cause these threads to bring up against the opposite flanks of the threads of the screw and thus limit the extents of relative rotation of the two members. The relative bodily movement of the members may, for example, be controlled by mutual threaded engagement, as shown and described in my co-pending application Serial No. 192,236, filed May 18, 1927. If the connecting thread has a pitch equal to that of the gaging thread there will be no relative apparent movement of the gaging members when the members are rotated, as the bodily axial movement of the members will exactly offset the apparent relative movement of the gaging threads. If the pitch of the connecting thread is less or greater than the pitch of the gaging thread, there will be apparent relative movement of the gaging threads, the rate of such movement per turn of the members depending on the difference in pitch between the gaging thread and the connecting thread. Thus, if this difference is considerable the slack between the gaging threads and the thread of a screw on which the gauge members are mounted is quickly taken up when the members are rotated, whereas if the difference is small, considerable relative rotation of the members is necessary to take up the same amount of slack or looseness. Since the amount of such slack to be taken up is, in the absence of lead error and malformation of the thread, a measure of the flank thickness of the screw to be tested, the relative rotation of the gauge members when in engagement with the screw is also a measure of the flank thickness. The sensitivity of the gauge may thus be determined by the choice of a connecting thread which differs in pitch from the gaging thread by little or much according as greater or less sensitivity is desired.

According to the present invention, the gauge members may be connected in such a way that the difference between their relative axial motion and the apparent relative motion of their threads need not be constant, but can be varied as by the use of cams. Thus for example a gauge of this type may be screwed on to a screw threaded member to be tested, then the two gauge members relatively rotated. According to the present invention, the axial movement of the members during such relative rotation may be so controlled that at first there is a quick take-up of most of the slack or looseness between the threads of the gauge members and the thread of the screw, then the rate of take-up may be much slower so that the gauge may be made very sensitive through the zones of tolerance without requiring excessive rotation of the gauge members from the open position to the zones.

For a complete disclosure of the invention, reference is had to the description thereof which follows, and to the drawings, of which,—

Figure 1 is a front elevation of a gauge of the ring type embodying the invention.

Figure 2 is an edge elevation of the same.

Figure 3 is a perspective view of one of the gaging members of the gauge illustrated in Figure 1.

Figure 4 is a perspective view of a second gaging member of the gauge shown in Figure 1.

Figure 5 is a plane development of the cam slots in the peripheral portion of the gaging member illustrated in Figure 3.

Figure 6 shows cam slots similar to those in Figure 5, but of modified configuration.

Figure 7 is a front elevation of a modified form of gauge embodying the invention.

Figure 8 is a section on the line 8—8 of Figure 7.

Figure 9 is a front elevation of another modified form of the invention.

Figure 10 is a section on the line 10—10 of Figure 9.

Figure 11 is an edge elevation of one of the gaging members of the gauge shown in Figure 9.

Figure 12 is a plane development of the peripheral portion of the member shown in Figure 11.

Figure 13 shows in elevation a gauge of the plug type embodying the present invention.

Figure 14 is a section on the line 14—14 of Figure 13.

Figure 15 is an end elevation of the gauge shown in Figure 13.

A gauge embodying the invention may have a form somewhat similar to that illustrated in Figures 1 to 4. As shown, this comprises a pair of gaging members in the form of perforated disks. One of these disks 20 is provided with an axial flange 21 which forms therewith a recess adapted to receive the other disk 22. The disk 22 is preferably fitted within the flange 21 so as to rotate freely therein. The disk 20 is centrally apertured as at 23 and the disk 22 is similarly apertured as at 24, these apertures being internally threaded for loose fitting engagement with the largest tolerable thread to be gaged when the gauge is in its "open" position, that is, when the gaging threads lie in a common helix. Each thread is preferably transversely slotted as at 25 so that any dust or other foreign matter which may happen to be on the flanks of the thread to be tested will be cleaned off as the screw to be tested is screwed into the apertures 23 and 24, such dust being collected in the slots 25. In order to control the relative axial bodily movement of the disks 20 and 22, I may form a plurality of slots 26 extending through the flange 21. The walls of these slots are adapted to act as cam surfaces to guide a corresponding number of pins 27, or equivalent cam followers, which may be secured to the periphery of the disk 22. The pins 27 besides acting as cam followers are also convenient handles for operating the gauge.

In assembling a gauge such as that illustrated in Figure 1, the disk 22 may be inserted into the recess surrounded by the flange 21, the pins 27 being thereafter inserted through their respective slots 26 and secured in radial holes previously formed in the edge of the disk 22. The pins 27 may be either screw threaded into the holes or driven thereinto so as to be securely held. The threads within the apertures 23 and 24 are preferably somewhat short, as indicated in Figure 2, a portion of the aperture 24 being bored out so as to shorten the threaded portion thereof. In this way the threaded engagement of the gaging members 20 and 22 on a screw to be tested is at spaced points. The extent of engagement of each gaging member is preferably equivalent to one or two turns of thread. The distance between the points of engagement of the members 20 and 22 with the thread to be tested may be regulated by the thickness of the disk 22, the flange 21 being preferably elongated correspondingly. It is preferred to regulate the distance between the mutually remote outer faces of the members 20 and 22 so that this distance will be approximately equal to the length of threaded engagement which the screw to be tested will have in actual service. If, for example, it is desired to test threads of bolts which are to extend into threaded holes in castings for the distance of an inch, it is preferred to construct the gauge so that the distance of overall engagement of the gauge with the screw to be tested will be approximately an inch. This feature is of special importance where a lead error is liable to be present in the screw to be tested. A lead error which would be serious in the case of a threaded engagement of an inch or so might not be objectionable in a screw of the same size if the working threaded engagement thereof were to be considerably less than an inch.

The gaging action of the gaging members arises from the apparent relative axial travel of the internal threads of the members when the members are relatively rotated. This approaching or separating movement of the threads takes up the slack of the loose fit between the gaging members and the screw to be tested, the amount of such slack being indicated by the amount of relative rotation of the members. If, however, the two members are free to travel bodily toward or away from each other, such bodily motion may entirely offset the apparent approaching and separating motion of their threads so that the slack between the threads of the gauge members and the thread of the screw to be tested is not taken up at all. By so controlling the relative bodily movement of the gaging members along the axis, the apparent approaching and separating movement of their threads can be regulated so as to be relatively large or small for any given angle of relative rotation of the members. The slots 26 may thus each be cut on a helix, the pitch of the helix being different from the pitch of the internal threads of the member. If the helix of the slots is in the same direction as the helix of the threads the apparent approaching and separating movement of the threads when the members are relatively rotated will be decreased, thus increasing the sensitivity of the gauge. By making the slots 26 with a pitch nearly equal to that of the threads of the members, the gauge may be constructed with as high a degree of sensitivity as desired. For practical purposes, however, it is not desirable ordinarily to have a gauge so sensitive that an unduly large angle of relative rotation of the members is required to take up the slack between the threads of the gauge and a screw of correct flank thickness. In order to take up quickly the larger part of the slack and then to have the gauge more sensitive in taking up the remainder of the slack, cam slots 28, such for example as are illustrated in Figure 6, may be provided. These slots, as shown, comprise a central portion which may be in a plane perpendicular to the axis of the gauge. While the pins 27 ride in this portion of the slots, the disks 20 and 22 are held against any relative axial bodily movement so that upon relative rotation the slack between the gauge threads and those of the screw to be tested is taken up comparatively rapidly. The remainder of the slack take-up is more gradual owing to the helical shape of the end portions of each of the slots 28, there being a bodily relative advance between the gaging members when the pins 27 enter the end portions of the slots 28. If desired, the central portion of the slots 28 may be pitched slightly in the direction opposite to the pitch of the end portions, this resulting in a still more rapid initial take-up of the slack between the threads. By varying the configuration of the slots 28, different types of relative advancing and separating motions between the threads of the gaging members may be obtained.

In order to facilitate the observation of slackness between the threads of the gaging members and the screw to be tested, I may provide an index 29 on one of the gaging members to cooperate with suitable scale marks on the other gaging member. As shown, the index 29 is located on the outer face of the disk 22, this index cooperating with suitable markings on the rim of the flange 21. One such mark may indicate the "open" position for the index 29 when the gauge members 22 are in such a position that their interior threads lie in a common helix. Thus when the index 29 is opposite the "open" mark, the gauge is ready to receive a screw to be tested. It is preferable that when the gauge is in this position the pins 27 are approximately at the mid points of the slots 26.

The employment of gaging members having threads which engage a screw to be tested over relatively short lengths of thread and at axially spaced points assists the operator in distinguishing error of lead from error of flank thickness. Lead error in a screw thread amounts to a virtual crowding together or axial stretching out of the turns of the thread. The most conspicuous result of lead error on a gauge of the type illustrated is an inequality of readings as the gaging members are relatively rotated first in one direction and then in the other. If the gaging threads are so made as to engage the thread under test over short lengths of thread and at spaced points, the spacing between the points of engagement magnifies any lead error present by the number of thread turns between the points of engagement. By reason of the short lengths of engagement, the shortening of the angle of throw of the gauge in one direction is approximately balanced by the increase of the angle of throw of the members in the opposite direction from the "open" position. Thus the mean of the two angles of throw will give approximately the angle to which the members would turn if the screw under test had no lead error. Hence this mean angle is an approximate measure of the flank thickness of the thread. While it may usually not be desired to ascertain the amount of lead error of a screw in terms of any particular unit, it is important to know whether the lead error is sufficient, in combination with whatever error of pitch diameter there may be present, to render the screw unfit for the service for which it is intended. For this purpose I may indicate zones of tolerance on the gauge, within which zones the index 29 must fall if the screw under test is to be accepted. Thus if the pitch diameter is correct or nearly so, a certain amount of leeway remains for lead error. Conversely, if there is little or no lead error present, the pitch diameter may vary within prescribed limits. In some screws there may be error both in pitch diameter and in lead, neither error being sufficient in itself to make the screw objectionable, but both together being sufficient to render the screw deficient. All such deficiencies are detachable by the gauge herein described so that no unfit screw escapes rejection if the gauge is properly manipulated.

In order to determine the extents of relative rotation the gaging members should have when in contact with a perfect thread to be tested, a master plug gauge may be screwed into the gauge and the gaging members relatively rotated in both directions as far as they will go until the slack between the threads is taken up each time. Suitable zero marks may be made on the rim of the flange 21 opposite the index 29 when the gauge members have been rotated in opposite directions so as to take up the slack between their threads and the thread of a standard plug gauge. When a screw thread is subsequently tested in the gauge, the angular distance of the index 29 from the nearest zero mark is an indication of how far from standard is the flank thickness of the screw under test, in the absence of lead error. Zones of tolerance may be indicated on the rim of the flange 21 or other suitable location, these zones being on either side of the "open" mark. The markings for such zones of tolerance depend upon the class of fit desired as well as the characteristics of structure of the gauge itself. These tolerance limits may be found by calculation or they may be located empirically by the use of master threads which have been accurately ground to dimensions on the border lines of tolerance.

In place of or in addition to the tolerance zones indicated on the gauge, there may be scale markings to indicate the flank thickness of the thread tested, either in fractions of some unit as an inch or in percentages of the standard flank thicknesses which a perfect screw of the type measured should have. If there is no lead error present, a scale calibrated in terms of percentage of standard flank thickness will give at once an accurate idea as to actual holding strength of the screw compared to that of a perfect screw, since the holding strength is closely related to the flank thickness thereof where the contour of the thread is fairly regular and the lead error is negligible. This information is of particular importance where the screw is destined for a use in which there is relatively little margin between its maximum holding strength and the actual stresses which are placed upon it. Thus, for example, in the construction of air craft, it is desirable to use screw-threaded members of minimum weight consistent with required holding power so that it is essential to determine how close each threaded element comes to the holding power of a perfect element of the same type.

A modified form of gauge is illustrated in Figures 7 and 8. In this form a disk 30 is nested in a recess formed by an axial flange 31 of a second disk 32. Instead of forming the cam surfaces in the flange 31, however, they are formed by slots 33 cut into the periphery of the disk 30. Suitable pins 34 may be projected through the rim 31 to enter the respective slots 33 and to act as cam followers against the sides of the cam slots. The action of the gauge may be determined as in the previous case by suitably shaping the slots 33. The operation of this gauge is identical with that of the gauge shown in Figure 1.

Figure 9 shows a further modified form of the invention, this gauge operating on the same principle as the ones hereinbefore described. This gauge may comprise a disk 35 which cooperates with a second disk 36. The latter is provided with an axial flange 37 which has an inturned lip 38. Through this inturned lip a number of set screws 39 are passed, the inner ends of these set screws being adapted to engage respectively cam surfaces on the sides of a flange 40 which is formed on or screwed to the periphery of the disk 35 and extends radially therefrom. As indicated in Figures 11 and 12 the flange 40 is composed of a number of segments, each of which may be in the form of a portion of a helix. Against each of these segments opposed abutments such as set-screws 39 bear so that as the disk 35 is rotated with respect to the disk 36, it is pushed toward or from the latter, the rate of such motion at any moment being determined by the pitch of the segments of the flange 40. In order to permit the assembling of the gauge of the form shown, the flange 37 of the disk 36 is preferably made separate therefrom and is secured thereto as by a suitable number of screws 41. The lip 38 on the flange 37 need not be continuous, but may be in the form of radial projections extending inwardly from the flange, and of sufficient size to support a set-screw 39. By shaping the cam surfaces of the cam 40 as desired, the action of the gauge may be modified in the same manner as the action of the gauges hereinbefore described.

In Figures 13, 14 and 15 is illustrated a gauge of the plug type embodying the present invention. As therein shown, this gauge may comprise a pair of external threads 45, 46, the thread 45 being mounted at the end of a suitable spindle 47 having a knurled finger piece 48 secured at the further end. This spindle is rotatively fitted within a sleeve 49, which carries the thread 46 at one end thereof. On its opposite end a flange 50 may be provided, this flange having a series of slots 51 therethrough, the sides of which constitute cam surfaces against which move cam followers such as pins 52, projecting from an enlarged portion 53 of the finger piece 48, the portion 53 being preferably of disk form and fitted for rotation within the flange 50. On the end face of the flange 50 I may provide suitable scale marks and/or zone-indicating marks, as well as a mark to indicate the "open" position of the gauge wherein the threads 45 and 46 lie in a common helix. To cooperate with the marks on the flange 50 I may provide a suitable index 54 on the enlarged portion 53 of the finger piece 48. When the finger piece 48 is rotated relatively to the flange 50, the thread 45 also rotates relatively to the thread 46. The slots 51 are preferably formed so as to cause bodily axial movement of the thread 45 relative to the thread 46 in such a manner as to modify the apparent relative axial movement of the threads caused by the rotation, as hereinbefore described in connection with the slots 26 and pins 27. In using a gauge of this type, the members are turned to the "open" position whereupon the gauge threads 45, 46 are screwed into engagement with a thread to be tested. The members are then relatively rotated in one direction, then the other, the amount of rotation possible in each case from the "open" position being observed. If the index 54 falls outside the zone of tolerance on either side, the tested piece may be rejected.

I claim:

1. A screw thread gauge comprising a pair of relatively rotatable members having gaging threads capable of lying in a common helix, and means connecting said members, said means including a cam of varying pitch and a cam follower for causing relative axial movement of said members when they are relatively rotated.

2. A screw thread gauge comprising a pair of relatively rotatable members having gaging threads capable of lying in a common helix and of receiving with a loose fit the maximum tolerable screw thread to be tested, and means connecting said gauge members and causing varying relative axial movement of said gauge members when relatively rotated, said means including a cam of varying pitch on one of said members and a cam follower on the other gauge member and in operative engagement with said cam.

3. A screw thread gauge comprising a pair of relatively rotatable disks having threaded bores the threads of which are capable of lying in a common helix and of a size to receive with a loose fit the maximum tolerable screw to be tested, means on said disks for holding said disks against relative radial movement, and means for causing controlled relative axial movement of said disks when relatively rotated, said latter means including a cam of varying pitch carried by one said disk and a cooperating cam follower carried by the other said disk.

4. A screw thread gauge comprising a pair of relatively rotatable disks having threaded bores the threads of which are capable of lying in a common helix and of a size to receive with a loose fit the maximum tolerable screw to be tested, means for holding said disks against relative radial movement, and means for causing controlled relative axial movement of said disks when relatively rotated, said latter means including a plurality of cams on one said disk and spaced about the bore thereof, and a cooperating cam follower for each said cams carried by the other said disk.

5. A screw thread gauge comprising a pair of relatively rotatable disks having threaded bores the threads of which are capable of lying in a common helix, an axial flange on one of said disks forming therewith a recess to receive the other said disk and to maintain the bores of the disks coaxial, said other disk having a series of cam grooves cut radially into the periphery thereof, and a series of cam followers projecting inwardly from said flange, each said cam follower being in cooperative engagement with one of said grooves.

6. A screw thread gauge comprising a pair of relatively rotatable disks having bores threaded to receive with a loose fit a screw to be tested having the maximum tolerable pitch diameter, a flange extending from the rim of one of said disks and forming a recess to receive the other said disk and cooperating elements on said flange and other disk respectively for causing relative axial movement of the disks when relatively rotated, said cooperating elements including a cam slot and a cam follower projecting into said slot.

7. A screw thread gauge comprising a pair of relatively rotatable disks having threaded bores therethrough, the threads of which are capable of lying in a common helix and of receiving with a loose fit a screw to be tested having the maximum tolerable pitch diameter, a flange extending from the periphery of one of said disks and forming a recess to receive the other disk and to maintain the assembled disks coaxial, said other disk having a series of slots in the periphery thereof making a varying angle with the plane of the disk, and pins extending inwardly from said flange into said slots to cause relative axial movement of said disks when relatively rotated.

In testimony whereof I have affixed my signature.

JAMES HARTNESS.